United States Patent [19]
Leclercq et al.

[11] Patent Number: 5,696,902
[45] Date of Patent: Dec. 9, 1997

[54] SYSTEM FOR MANAGEMENT OF THE USAGE OF DATA CONSULTATIONS IN A TELECOMMUNICATION NETWORK

[75] Inventors: Thierry Leclercq, Paris; Patrick Sallio, Thorigné-Fouillard, both of France

[73] Assignees: France Telecom; Telediffusion De France, both of Paris, France

[21] Appl. No.: 316,466

[22] Filed: Oct. 3, 1994

[30] Foreign Application Priority Data

Oct. 4, 1993 [FR] France .................. 93 11801

[51] Int. Cl.$^6$ ............................. H01J 13/00
[52] U.S. Cl. .................. 395/200.2; 395/200.02; 395/200.03; 395/200.06; 395/200.11; 395/200.12; 395/200.13; 395/200.14; 235/379; 235/380; 235/381; 235/382; 370/110.1; 379/91; 379/93
[58] Field of Search ............ 395/200.01, 200.06, 395/200.07, 200.09, 200.1, 200.14, 200.11, 200.12, 200.2, 200.21; 364/406; 379/91, 93; 235/379, 380, 381, 382; 370/110.1

[56] References Cited

U.S. PATENT DOCUMENTS

| | | |
|---|---|---|
| 4,879,742 | 11/1989 | Taniguchi et al. . |
| 5,283,829 | 2/1994 | Anderson .................. 380/24 |
| 5,444,849 | 8/1995 | Farrand et al. .......... 395/200.09 |
| 5,446,740 | 8/1995 | Yien et al. ............... 395/200.01 |
| 5,457,739 | 10/1995 | Le Cheviller ............. 379/93 |
| 5,490,251 | 2/1996 | Clark et al. ............. 395/200.2 |

FOREIGN PATENT DOCUMENTS 0 539 016  4/1993  European Pat. Off. .

OTHER PUBLICATIONS

Patent Abstracts of Japan, vol. 6, No. 182, 18 Sep. 1982, JP-A-57 095.

*Primary Examiner*—Jack B. Harvey
*Assistant Examiner*—Raymond N. Phan
*Attorney, Agent, or Firm*—Larson & Taylor

[57] ABSTRACT

A system for management of the usage of consultations in a telecommunication network, in which one consultation is carried out by communication between a remote server center, and a local subscriber terminal, via a telecommunication link of switched type. A usage management module is provided, which is external to the link and makes it possible, through interactive communication between the local subscriber terminal and the management module, as well as between the management module and the remote server center, to set up, monitor and acknowledge the usage between the remote server center and a subscriber terminal.

10 Claims, 7 Drawing Sheets

TIMECHART OF EXCHANGES

TIMECHART OF EXCHANGES

FIG. 4a  MANAGEMENT MODULE

FIG. 4b  LOCAL SUBSCRIBER TERMINAL

FIG. 4c  REMOTE SERVER CENTRE

SYSTEM FOR MANAGEMENT OF THE USAGE OF DATA CONSULTATIONS IN A TELECOMMUNICATION NETWORK

The present invention relates to a system for management of the usage of data consultations in a telecommunication network.

With the rise in data consultation traffic in telecommunication networks, of the digital data transmission network type, a rise due in particular to the increase in and the growing diversity of service provisions supplied by server centres connected to these networks, a major problem of accessibility is currently apparent owing to the declining nature of the availability of these server centres. Although the aforesaid accessibility problem is not posed directly by the transmission capacity of modern digital networks, direct management of the usage of data consultations between subscribers and aforesaid server centres by these latter presents, in the first place, the disadvantage of systematically increasing the duration of the access time, and ultimately the congestion of the network. In the second place it presents the drawback of management bound by the authority responsible for each server centre, something which may slow the development of requests for access thereto by subscribers, the aforesaid responsible authority inevitably becoming judge and jury in the event of management-related litigation with one or more subscribers.

The subject of the present invention is a system for management of the usage of data consultations in a telecommunication network, making it possible in particular to remedy the aforesaid drawbacks.

Another subject of the present invention is in particular the implementation of a system for management of the usage of data consultations in a telecommunication network making it possible to offer suppliers of consultation and remote-entry services in modern digital telecommunication networks the taking into account by a third party of any operation of management of access to the services, of payment for the contents and refund, third parties in whom the various participants have every confidence, this management system appearing, to these participants, as a true tele-informative mediator.

Another subject of the present invention is also the implementation of a system for management of the usage of data consultations in a telecommunication network employing universal mechanisms, which are independent of the specific characteristics of the telecommunication networks.

Another subject of the present invention is also the implementation of a system for managing the usage of data consultations in a telecommunication network, having very great flexibility of use relative to the diversity of services supplied.

Another subject of the present invention is also the implementation of a system for managing the usage of data consultations in a telecommunication network making it possible to rate certain particular subscribers on the basis of specific patterns of usage.

Another subject of the present invention is also the implementation of a system for managing the usage of traffic consultations for a telecommunication network making it possible to offer any subscriber using the network a single networking console or point of entry.

Another subject of the present invention is lastly the implementation of a system for managing the usage of data consultations in a telecommunication network exhibiting the characteristics of an access multinetwork, of a distribution/usage multinetwork, and of multi-application, this allowing service-supplying server centres a very high flexibility in tariff setting and a very great facility for internationalizing the offering and provision of service.

The system for managing the usage of data consultations in a network for telecommunication between a remote server centre and a local subscriber terminal, communication between the remote server centre and the local subscriber terminal being carried out by way of a link of switched type, is notable in that it includes a usage-management module, external to this link, making it possible, through a communication of interactive type between, on the one hand, the local subscriber terminal and the management module, and, on the other hand, between the management module and the remote server centre, to set up, monitor and acknowledge the said usage between the remote server centre and the local subscriber terminal.

The system for management of the usage of data consultations in a telecommunication network, which is the subject of the present invention, is applicable to the management of the usage of data consultations in a network for telecommunication between a local subscriber terminal and a remote server centre, local subscriber terminal and remote server centre being located in the same national territory or in separate national territories.

A more detailed description of the system for management of the usage of data consultations which is the subject of the present invention will be given in connection with the drawings hereafter in which.

A more detailed description of a system for management of the usage of data consultations in a network for telecommunication between a remote server centre and a local subscriber terminal, in accordance with the subject of the present invention, will now be given in connection with FIG. 1a and the following figures.

In the first place, the concepts of local subscriber terminal and remote server centre will be made clear within the meaning employed in the context of the description of the present patent application.

A local subscriber terminal is a terminal capable of generating and receiving messages in a telecommunication network, in accordance with the telecommunications-related legal stipulations of a given national territory.

A remote server centre is a server centre capable of generating and receiving messages in a telecommunication network, this server centre being situated in the same national territory or in a national territory separate from the territory in which any local subscriber terminal, according to the aforesaid definition, is situated.

Thus, the link between the remote server centre, denoted SA, and the local subscriber terminal, denoted T, is effected by way of a telecommunication link of switched type. It will be recalled that the concept of a telecommunication link of switched type covers both the switching of networks and the switching of information packets transmitted in digital form.

In accordance with a particularly notable aspect of the management system which is the subject of the present invention, the latter comprises a management module, denoted MG, for this usage, this module being external to the link between the remote server, SA, and the local subscriber terminal, T. It is pointed out that, generally, the management module, MG, makes it possible, through a communication of interactive type between, on the one hand, the local subscriber terminal, T, and the management module, MG, by way of a link denoted 1 in FIG. 1a, and, on the other hand, between the management module, MG, and the remote server centre, SA, by way of links 2 and 4, for example, to set up, monitor and acknowledge the usage of consultations set up by way of the switched-type telecommunication link, denoted 3 in FIG. 1a, between the remote server centre, SA, and the subscriber terminal, T.

A more detailed description of the structure of the management system which is the subject of the present invention will now be given in connection with FIG. 1b.

According to an advantageous characteristic of the aforesaid management system, communication between the said management module, MG, and the remote subscriber terminal, T, can be carried out by way of a telecommunication link whose data rate is less than or equal to the data rate of the link between the local subscriber terminal, T and the remote server, SA.

In a particular embodiment, it is pointed out that the aforesaid telecommunication links can consist of a link of the integrated services digital network type, ISDN, and in particular of the NUMERIS network (1B), as regards the link denoted 1 between the local subscriber terminal T and the management module, MG, and of this same NUMERIS network (1B) or (2B), as regards the switched type telecommunication link between the local subscriber terminal, T, and the remote server, SA.

As regards communication between the management module, MG, and the remote server centre, SA, it can preferably be carried out by way of a packet-switching digital link satisfying the X.25 packet-switching recommendation of the C.C.I.T.T. (International Telegraph and Telephone Consultative Committee).

It is pointed out that this link can in particular be effected by a specialized link, LS, or by way of the TRANSPAC network. In FIG. 1b, these links are denoted LS or TPC respectively.

Generally, it is pointed out that the local subscriber terminal, T, can be embodied by means of a personal microcomputer, of PC type, including a microprocessor of the INTEL 80 486 type. The management module, MG, can be constructed from a PC-type microcomputer including a microprocessor of the INTEL 80 386 type for example, as will be described later in the description.

Figure 1A:
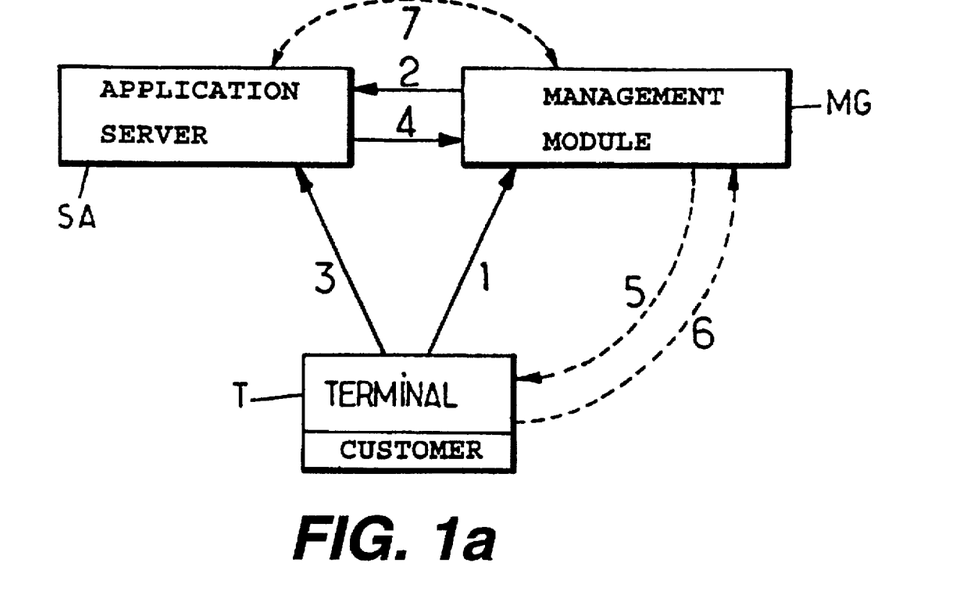
FIG. 1a represents a block diagram of a system for management of the usage of consultations in a telecommunication network in accordance with the subject of the present invention.
Figure 1B:
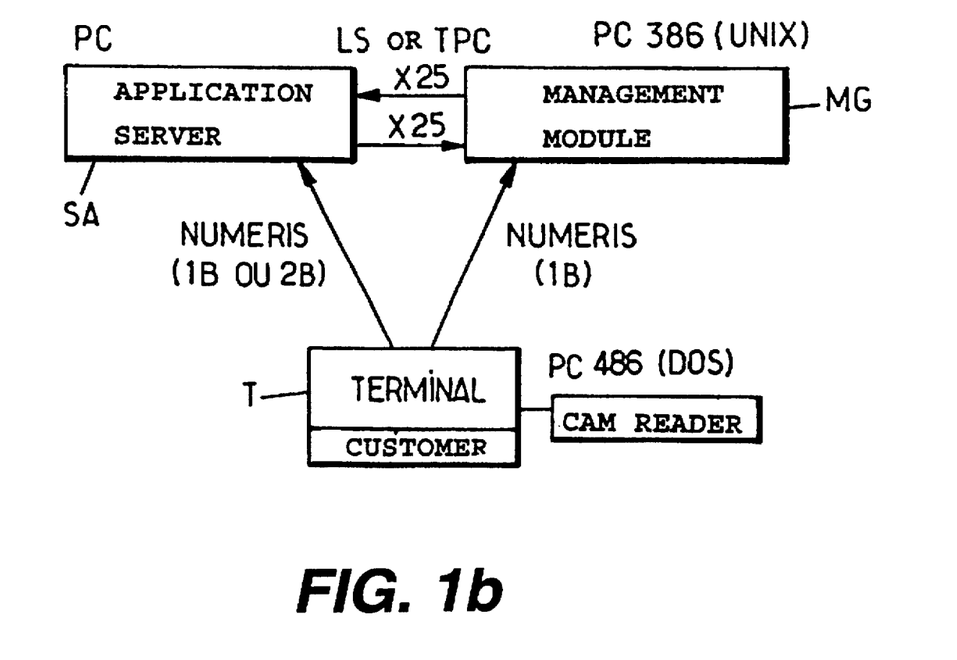
FIG. 1b represents a particular embodiment of the system which is the subject of the present invention such as represented in FIG. 1a, FIGS. 1c and 1d represent, by way of illustration, a timing diagram of the exchanges of messages between the various constituent elements of the system which is the subject of the present invention, these exchanges together possibly constituting a communication protocol of interactive type between these various elements.
Figure 1C:
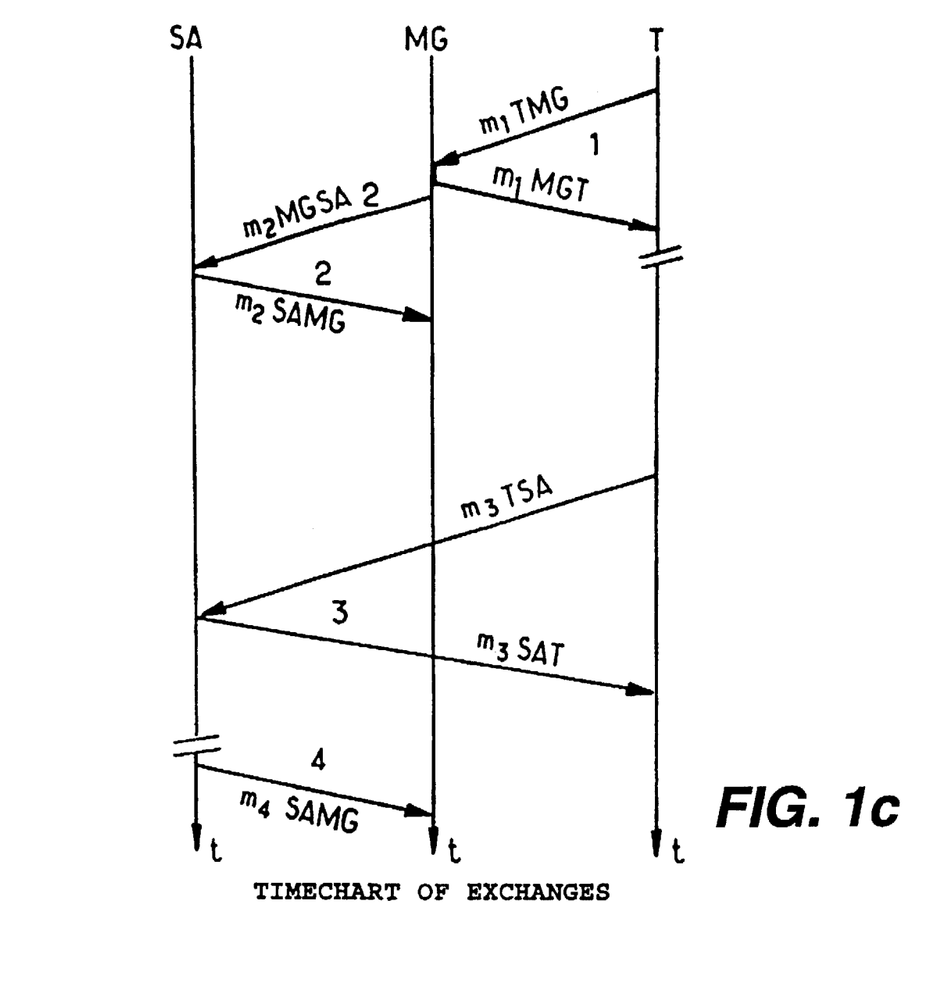

Of course, the management system which is the subject of the present invention employs for its operation, that is to say in order to set up communication of interactive type between the various elements, a communication protocol which is illustrated diagrammatically in FIG. 1c.

In the aforesaid figure, it is pointed out that the vertical axis represents the time axis, starting from an arbitrary origin, the events being plotted for the local subscriber terminal, T, the management module, MG, and the remote server, SA. These events correspond to the sending and/or receiving of messages whose numbered indices correspond to the number of the link followed.

According to a particularly advantageous aspect of the management system which is the subject of the present invention, the communication protocol includes at least successively the steps of connection of the local subscriber terminal, T, to the management module, MG, and of acknowledgement of this connection. For convenience, the acknowledgement messages, which form part of the protocols normally employed for the transmission and reception of data over the various relevant links, will be neither designated nor described in detail since these acknowledgement messages correspond to known message formats.

The message for connection of the local subscriber terminal to the management module, MG, this message being denoted $m_1TMG$, is transmitted over the aforesaid telecommunication link 1, in the form of a short communication, that is to say a communication whose duration is between at most 10 seconds and 15 seconds.

The connection message, $m_1TMG$, can comprise, in an advantageous embodiment, a subscriber identification field, the subscriber possibly having, at the level of the local subscriber terminal, a password or identification card reader, this subscriber possibly being the holder of a corresponding identification card. The connection request message, $m_1TMG$, can also include a field for nomination by the customer of the identity of the service which he wishes to use, that is to say the identity of the remote server centre and of the nature of the data or information which he wishes to obtain therefrom, and taken into account by the management module, MG, a field representing the profile and class of the subscriber, as will be described later in the description.

Subsequent to the reception by the management module, MG, of the aforesaid connection request message $m_1TMG$, the management module, MG, makes it possible, under the criterion of comparability of the data contained in the connection request message, $m_1TMG$, with preloaded parameters relating to this subscriber, to authorize or deny the opening of a credit allotted by transaction and access by this subscriber to the requested service, that is to say to the identified remote server centre, SA.

Upon a positive decision relative to this authorization, the management module, MG, makes it possible to assign to the relevant subscriber a temporary key authorising, in respect of this subscriber, access to the application server, SA, and the making available of the information necessary for connection to the aforesaid remote server or application server, SA. This information necessary for connection relates for example to an access or call code for the aforesaid server.

Subsequent to the aforesaid positive decision, an operation 2 of transmission by the management module, MG, to the remote server centre of a service request authorization message in respect of the relevant subscriber terminal is performed by the dispatching by the management module, MG, to the remote server centre, SA, of a corresponding message, denoted $m_2MGSA$ in FIG. 1c. This message $m_2MGSA$ includes the temporary key for access to the remote server centre, SA.

The temporary key is generated by the management module MG when a customer, who has satisfied password, credit and profile checks, selects the application service which he wishes to consult. It is firstly transmitted to the application server which keeps it for a certain time. It is then transmitted to the terminal, which supplies it to the server at the time of the call. The contents of the key comply with the following constraints:

it must be the unique reference, present in all exchanges related to a transaction (usage of a service and billing): T-MG, MG-SA and T-SA exchanges, it must make it possible, in the event of litigation, to retrieve the log of a transaction, it must not be able to be "guessed" by a customer whilst it is valid in respect of the remote server centre SA.

On the basis of these criteria, a suitable structure may be as follows:

complete key: [customer code] [SA code] [year] [date] [record number], together with [year] in two digits [date], day of the year from 1 to 365, [record number] equal to [time] equal to [random number], with [time] in hh mm ss of the assigning of the key, and [random number], numeral from 0000 to 9999. For example, the complete key generated for the customer with code 0001, service 0002, on 6 Jan., 1993 at 14 h 32 min 10 s, created with a random number 9876 will be:

```
0001  0002  9.3   006   14 32 10   9786
US    SA    YEAR  DATE  TIME       RANDOM NO.
```

<————————————————————>
Record No., abridged key

<————————————————————————————>
Complete key

Only the number of the record (abridged key) is known to the customer. It is displayed on the screen of the terminal before connection to the application server. This record number being unique, it makes it possible to retrieve a posteriori the events which occurred during the transaction (causes of error or charging problems). The management module MG ensures that two customers cannot have the same record number by comparing it with the numbers already generated during the current second.

Generally, and particularly advantageously, it is pointed out that the transmission of the message $m_2MGSA$ is performed likewise through a short communication, allowing the transmission of the previously mentioned temporary key to the remote server centre, SA, of the amount of credit allotted by the management module, MG, as well as of specific information regarding the subscriber, the configuration of the local terminal in his possession and the link with the server centre, SA.

The management module, MG, transmits by way of the link 1, mentioned previously, a message for activation of the local subscriber terminal, T, this message being denoted $m_1MGT$ and containing in particular the temporary key for access to the remote server centre, SA, so as to allow the local subscriber terminal, T, to make the request for connection with the aforesaid remote server centre, SA.

Subsequent to the reception of the validation message $m_1MGT$, mentioned previously, the link 1 is broken. The local subscriber terminal, T, then transmits a connection request message from the subscriber terminal to the remote server centre, this message being denoted $m_3TSA$ and transmitted by way of the switched type telecommunication link 3.

Generally, it is pointed out that this connection request message, $m_3TSA$, naturally includes the temporary access key which, being likewise known to the remote server centre, SA, makes it possible to perform the direct interconnection of the local subscriber terminal, T, and the remote server centre, SA, under the customary conditions of connection specific to this type of telecommunication link, such as the integrated services digital network (ISDN).

Naturally, subsequent to the reception of the connection request message, $m_3TSA$, the remote server centre, SA, can generate a message for validation of the aforesaid connection request message and performs the transmission and the exchange of data between the remote server centre, SA, and the subscriber terminal, T, in accordance with the service provision requested, by dispatching one or more successive messages, which with a view to simplification will be denoted by the designation $m_3SAT$. The exchange of data, and, consequently, the provision of the service requested, is of course performed by the link 3 mentioned previously in the description.

Lastly, subsequent to the supplying of the requested service provision, the link 3 is broken by the remote server centre, SA, which, in accordance with a particularly advantageous aspect of the protocol for interactive dialogue between the various elements of the management system which is the subject of the present invention, performs the transmission to the management module, MG, of a service provision status message denoted $m_4SAMG$ via the link 4 to the management module, MG. It is recalled that the transmission of this service provision status message is performed by a packet-switched digital link of the specialized link type, or TRANSPAC.

Generally, it is pointed out that the connection request message from the local subscriber terminal to the remote server centre, message $m_3TSA$ in FIG. 1c, can include information allowing the subscriber to negotiate the actual amount of the usage in accordance with specific commercial criteria, such as purchase volume, decreasing tariff, supply and demand algorithm, type of use and customer profile, as mentioned previously.

As regards the service provision status message, $m_4SAMG$, transmitted from the remote server centre, SA, to the management module, MG, it is pointed out that the latter is likewise performed by way of a short communication, this message relating to certain characteristics of the usage by the subscriber, characteristics such as the previously mentioned nature and negotiated amount for example.

Generally, it is pointed out that unacknowledged usage is not billed by the management module, MG, and that usage exceeding the amount authorized by the management module, MG, that is to say an amount used which is greater than the credit allotted, also cannot be billed in its entirety by the management module, MG.

Figure 1D:
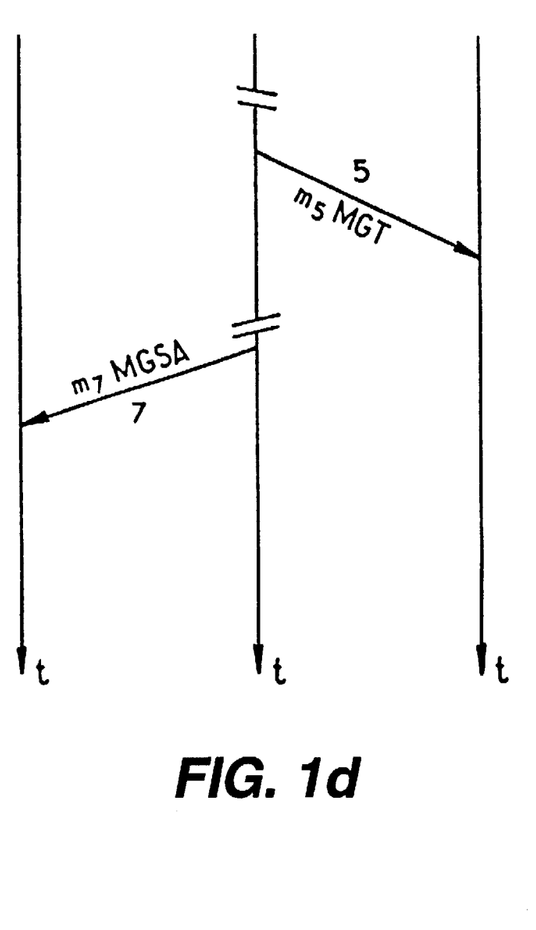

Furthermore, as represented in FIG. 1d, the interactive communication protocol for the various constituent elements of the management system which is the subject of the present invention can include, subsequent to validation of the service provision status message, message $m_4SAMG$ mentioned previously, steps of transmission by the management module, MG, to the local subscriber terminal, T, of a message, denoted $m_5MGT$, of information regarding the billing of the service provision undertaken, this message consisting essentially of a debit associated with the relevant subscriber terminal, T.

The protocol can furthermore include, as represented in FIG. 1d, a step of transmission by the management module, MG, to the remote server centre, SA, of a message, denoted $m_7MGSA$, of refund of the remaining credit allotted in favour of the subscriber terminal, T.

The information message regarding billing, $m_5MGT$, is compiled from a customer account file-file of payers, which is managed by the management module, MG, allowing management of the billing for the account of a supplier, that is to say for the account of a remote server centre, SA. This information can contain, for example, the frequency of sending of bills and the type of billing for usage.

By way of non-limiting example, in FIGS. 1a and 1b in particular, it is indicated that payment by the subscriber of his bill at the management module, MG, can be undertaken in particular by way of electronic payment. This type of payment will be described later in the description.

As regards transmission by the management module, MG, to the remote server centre, SA, of the refund message, $m_7MGSA$, it is indicated that this message comprises information compiled in accordance with the criterion negotiated by contract between the subscriber and the management module, MG, on the basis of the arrangements for remuneration and payment for provisions rendered.

Generally, it is pointed out that the step of connection of the local subscriber terminal, T, to the management module, MG, the step of transmission by the management module, MG, to the remote server centre, SA, of the service request authorization message and the step of transmission by the local subscriber terminal, T, to the remote server centre, SA, of a connection request message, $m_3TSA$, as well as the step of transmission and of exchange of data between the remote server centre and the subscriber terminal, T, then the step of transmission by the remote server centre, SA, to the management means of the service provision status message, $m_4SAMG$, can be carried out in real time. By carrying out these steps in real time, it is pointed out that the only offsets in time between the sequential carrying-out of the transmission of these various messages is attributable to the message transmission time and to the response time of the decision elements, subsequent to the reception of the aforesaid messages.

By contrast, as regards the step of transmission by the management module, MG, to the local subscriber terminal, T, of the billing message, $m_5MGT$, and the step of transmission by the management module, MG, to the remote server centre, SA, of the refund message, $m_7MGSA$, it is indicated that these steps can be performed in real time by corresponding links 5 or 7, under the conditions defined previously or in non-real time. Of course, execution of these steps in non-real time can be carried out by non-datacomms means, the information message regarding billing, $m_5MGT$, possibly consisting in such a case of a message in the form of a postal letter, for example. The same is also true when, for the payment of the billing represented by step 6 in FIG. 1a, for example, payment is made by non-electronic or non-datacomms means of payment.

A more detailed description of the various functions actually carried out by the management module, MG, of the management system which is the subject of the present invention, for implementation of the previously described protocol, in connection with FIGS. 1c and 1d, will now be given in relation to FIG. 2a.

Generally, it is pointed out that the management module, MG, includes the following functions:

management of access in respect of a relevant subscriber, identification of the subscriber, centralized management of access, that is to say control of access to the remote server centre, supplier of provisions, with the aim of payment and sending-out of the temporary access keys, at 1001, management of cards in the case where an access card is allocated to each subscriber, or management of a password, management, at 1002, of the contracts and of the subscriber customer accounts, that is to say management of the rights associated with the latter, of their credits, of ceilings, of updated defaulters, of supervision lists of red-list type, at 1002, management of the payment of the contents used in the relevant remote server, SA, sending of bills and close management of billing, at 1008, recovery of these bills for the account of the suppliers, that is to say management of a customer account by the remote server centre, SA, at 1004, payment interface, accounting, at 1006, refund management, management of the supplier contracts for each remote server centre, SA, and refund to them, at 1004, as well as statistics of usage Within this same module, management of a directory, at 1003, with management of services corresponding to commercial tendering of the management module, MG, option of downloading lists of directories, utilization of the directory as service promotion advertising by the remote server centre, SA, management of the operating interface together with in particular, at 1005, execution of the physical links 2 and 4 by way of the packet-switched link between the management module, MG, and each remote server centre, SA, refund management, at 1007, and billing management, at 1008.

It is of course understood that the aforesaid modules, denoted 1000 to 1008, are embodied by the corresponding program modules within which all the parameters are encoded in logic variable form.

Figure 2A:
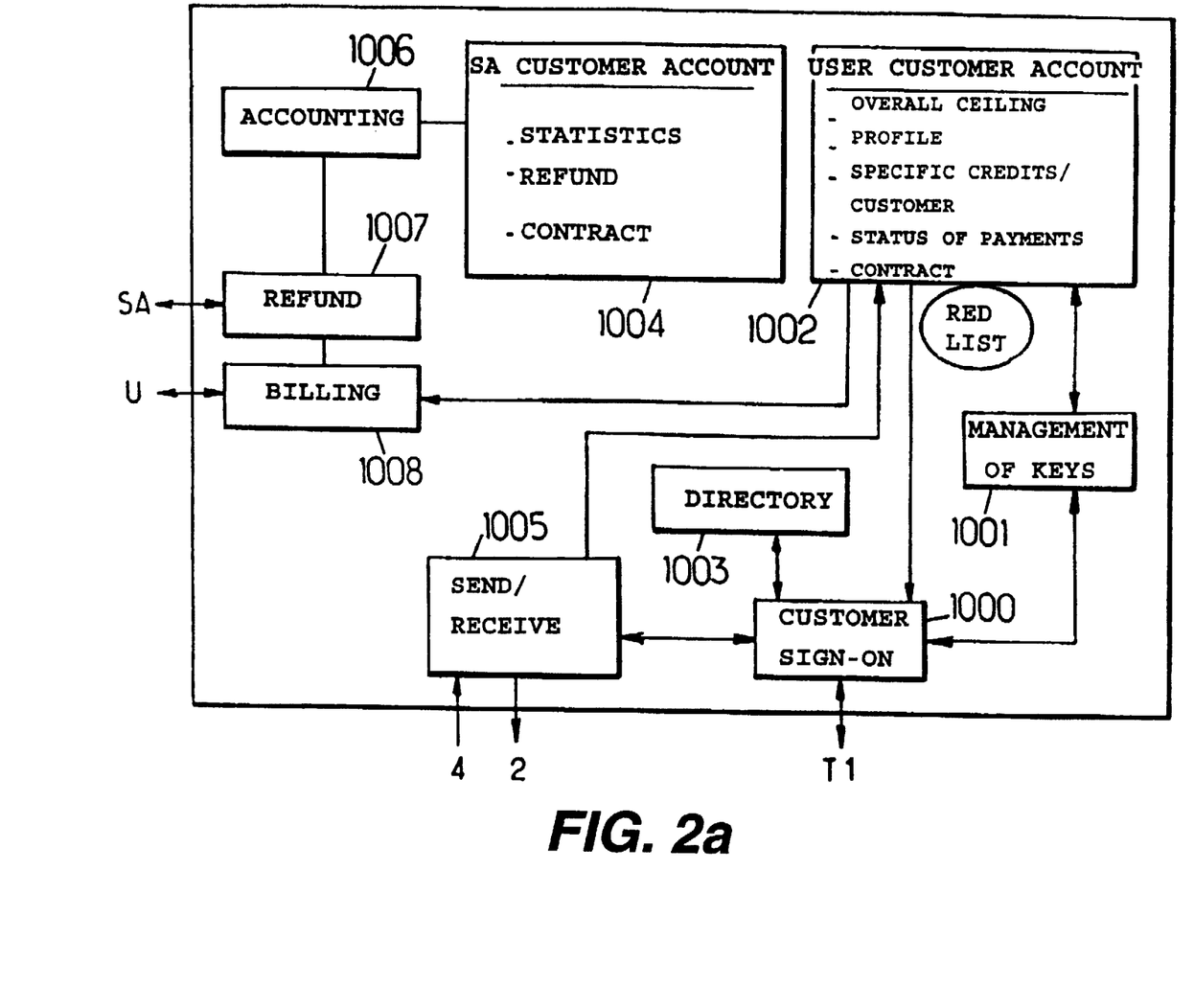
FIG. 2a represents, in block diagram form, a functional breakdown of a consultation-usage management module which is a constituent of a system which is the subject of the present invention.
Figure 2B:
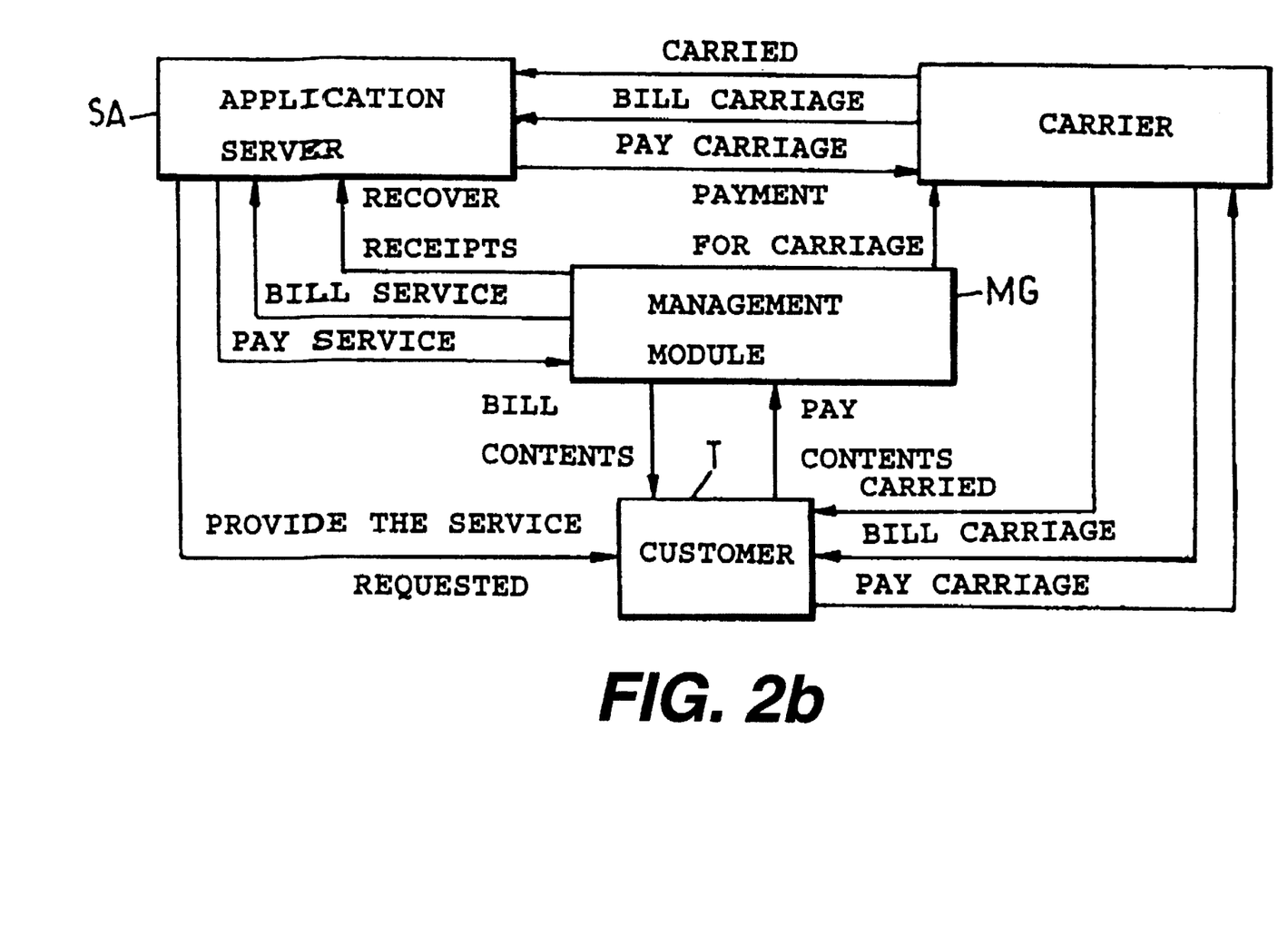
FIG. 2b represents a chart for sharing the tasks among the various constituent elements of the system which is the subject of the present invention and an operator undertaking the carriage or conveying of the messages and of the consulted data.

In FIG. 2b is represented a chart of the sharing of tasks between the management system which is the subject of the present invention, formed by a terminal, T, local subscriber, a management module, MG, and one or more remote servers, SA, all these elements being interconnected, as described previously in the description, in connection with FIGS. 1a or 1b, for example, by means of the telecommunication lines and links managed by the carrier, which thereby undertakes sole provision for the conveying of the data between the various aforesaid elements.

As may be observed in the aforesaid FIG. 2b, the communications 1, 2 and 4 are of short duration, and this makes it possible to envisage the implementation of the management system which is the subject of the present invention under the conditions described previously. It is pointed out in particular that the management module can be placed with respect to the local subscriber terminal, T, either locally, according to the definition given earlier in the description, that is to say that the management module, MG, is situated in the same national territory as the local subscriber terminal utilizing the latter, or on the contrary situated remotely, the management module, MG, being situated in a national territory separate from that in which is situated the local subscriber terminal, T, calling upon the aforesaid management module, MG.

It is thus understood that, for any given installation site for the management module, MG, that is to say any national territory, the latter, although remaining subject from the point of view of the transmission of messages to the corresponding telecommunications-related national legislation, can however comprise within its tariff-setting and contract management modules all the elements corresponding to particular specifications of the national territory, within which the local subscriber terminal, T, is installed.

In this respect, it is pointed out that, according to a particularly advantageous characteristic of the management system which is the subject of the present invention, effective separation of tariff setting between the contacts of the information carried and the carriage of this information is therefore implemented as follows:

payment on action by the subscriber, the amount of which is wholly controlled by the remote server centre, SA, and specific billing by the management module, MG, carriage: the communications 1 and 3 are taken on board by the subscriber on the telecommunication bill compiled by the authority of the country in which the local subscriber terminal is installed, the communications 2 and 4 being taken on board by the management module, MG/remote server centre, SA pair.

The management module, MG, allows payment for usage of low or, on the contrary, high amount. It takes the risk of authorizing or denying the credit allotted to the local subscriber terminal, T, of managing disputes such as defaulters, non-deliveries of the provision, and manages subscriber refunds.

The management module, MG, is apparently a necessary agent in solving disputes of any kind.

In connection with FIG. 2b, it is pointed out that the national authority providing for the carriage or conveying of the data transported by the various messages provides for the carriage of this data, the billing of this carriage in accordance with the regulations specific to the legislation in force in the relevant country depending on the place of installation, either of the corresponding local subscriber terminal, or of the aforesaid application server or remote server centre, SA.

On the contrary, the management module, MG, bills the service to the remote server centre, SA, and the contents of the provision to the local subscriber terminal, T.

Various alternative embodiments of the management system which is the subject of the present invention will now be described in connection with FIGS. 3a and 3c.

Figure 3A:
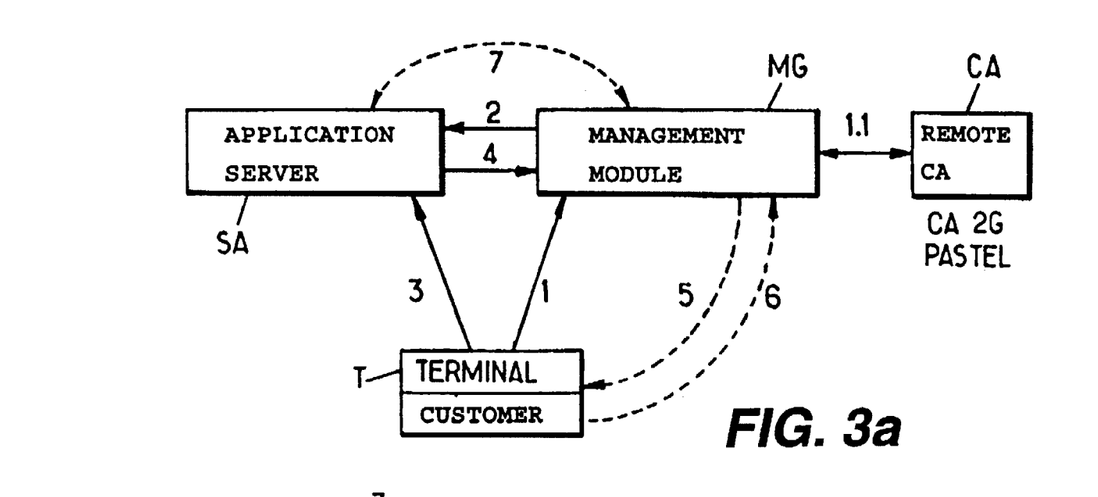
FIGS. 3a, 3b and 3c represent respectively a first, a second and a third variant embodiment of the system which is the subject of the present invention, such as represented in FIG. 1a, FIGS. 4a, 4b and 4c represent respectively a block diagram of the hardware configuration of the management module, of the local terminal and of a remote server centre, application server, allowing the construction of a system according to the object of the present invention.

In a first particular embodiment represented in FIG. 3a it is pointed out that there can be associated with the management module, MG, a means of identification consisting for example of a remote authorization centre, CA, interconnected to the management module, MG, by way of a packet-switching link, denoted 1.1, of X.25 type, for example. Thus, this link can therefore consist of a link comparable to the links 2 and 4 of FIG. 1a, 1b. In such a case, the local subscriber terminal, T, can be furnished with a card reader, and the subscriber can be the holder of a stand-alone access card, for example a card of the PASTEL type which does indeed provide a means of identification, but not a point of entry means to the management service, and in particular to the management module, MG. It is also pointed out that the stand-alone access card can consist of a PC2 card, for example. The link 1.1 is a real-the link which is effected under the protocol associated with the management system which is the subject of the present invention, immediately after the link 1, but prior to the link 2.

It is pointed out lastly that the aforesaid link 1.1 can allow the downloading of discriminatory lists, red lists, under the supervision of the management module, MG, from the remote authorization centre, CA.

Figure 3B:
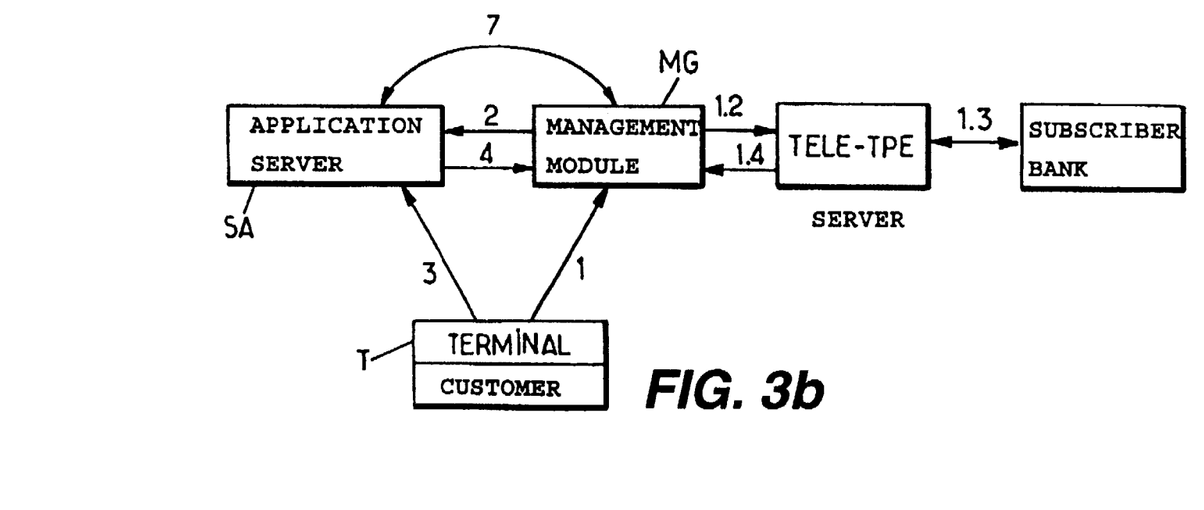

In FIG. 3b is represented a second alternative embodiment, in which payment is effected with the aid of electronic payment means for example.

Depicted, in connection with FIG. 3b, is the use of a bank-card type procedure with a possible opening to subscribers or customers of the general-public type, especially with a view to making an effective prepayment.

Three ways of making a remote payment by bank card can be envisaged:

the management module, MG, manages access to an electronic payment terminal, denoted TPE, by way of a link, denoted 1.2, this electronic payment terminal being remote, of known type, this electronic payment terminal itself being interconnected by a link 1.3 to the subscriber's banking organization. The prepayment is then made by way of the link 1.4 to the management module, MG, and this comes close to the procedures for secure telepayment by bank card with network rerouting function. It is pointed out that links 1.2, 1.3 and 1.4 are links of the packet-switching telecommunication link-type for example, such as links 2 and 4 described previously in the description.

the management module, MG, can also be recognized as an electronic payment terminal by the banking organization. In such a case, the links 1.2 and 1.4 can then be omitted.

payment can also be made directly at the remote server centre or application server, SA.

It is pointed out that, in the case of FIG. 3b, the payment made is a payment of the just-before-usage type, according to a procedure for making deposits into an intermediate account, such as an electronic purse, PME.

Figure 3C:
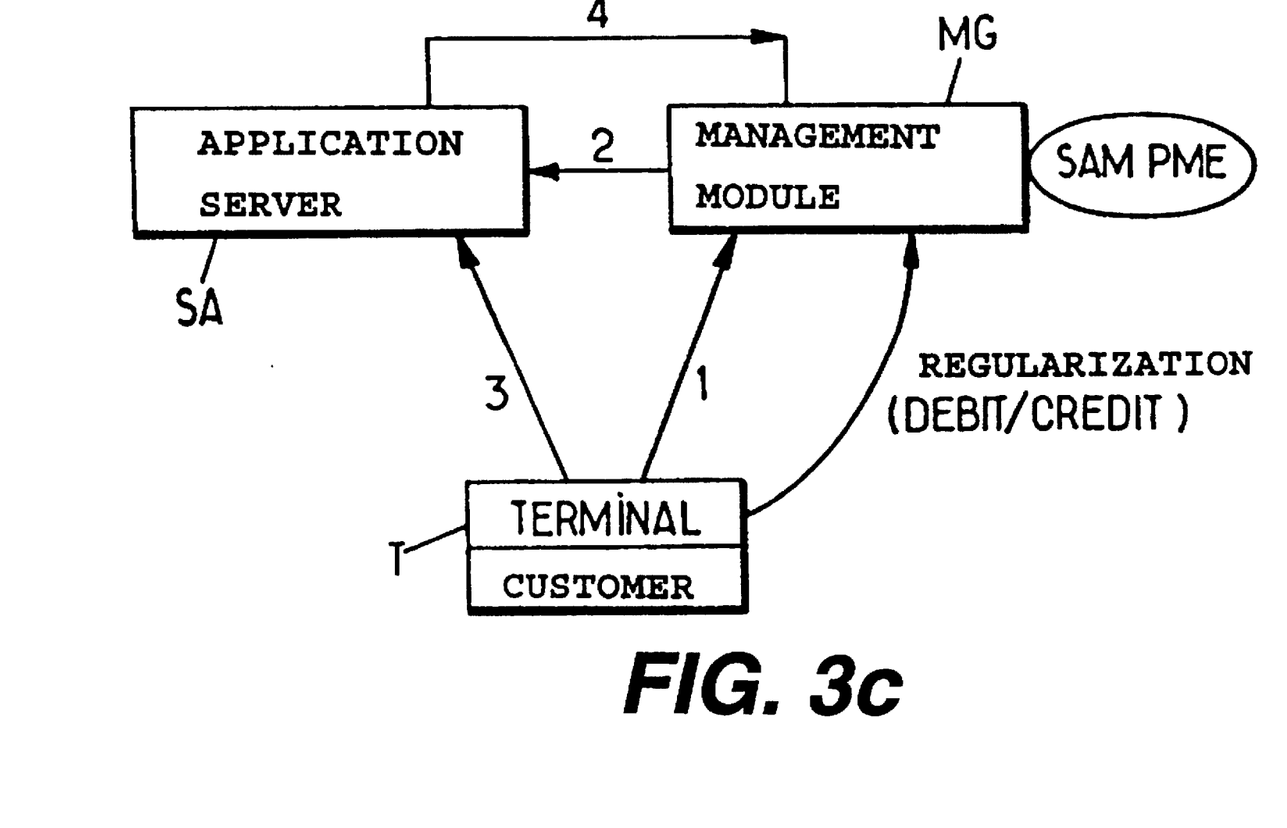

Lastly, in the case of FIG. 3c, the electronic payment is made by way of an intermediate account, of the electronic purse or electronic token-holder type, in an identified phase at the end of usage. In such a case, it is pointed out that the management module, MG, has or has access to a security authentification module SAM.

So as to avoid a break in communication between the remote server and the local subscriber terminal, in respect of a payment into the electronic purse, PME, and forced return at the end of connection 3 to the management module, MG, it is then sensible to provide for the debitting of the electronic purse, PME, of the subscriber, not only just after usage, but on the next connection of the subscriber to the corresponding remote server. In such a case, the management module, MG, in fact performs a regularization, the management module retaining a bill pending which can be analyzed as a temporary credit.

Such a mechanism can be operated both for the management of the electronic purse, PME, and that of the electronic token-holder, PJE. In the latter case, the concept of security authentification module disappears.

A more detailed description of the management module, MG, of the local subscriber terminal, T, and of the remote server centre, SA, or at the least a hardware configuration envisaged for them will be given in connection with FIGS. 4a, 4b and 4c.

Figure 4A:
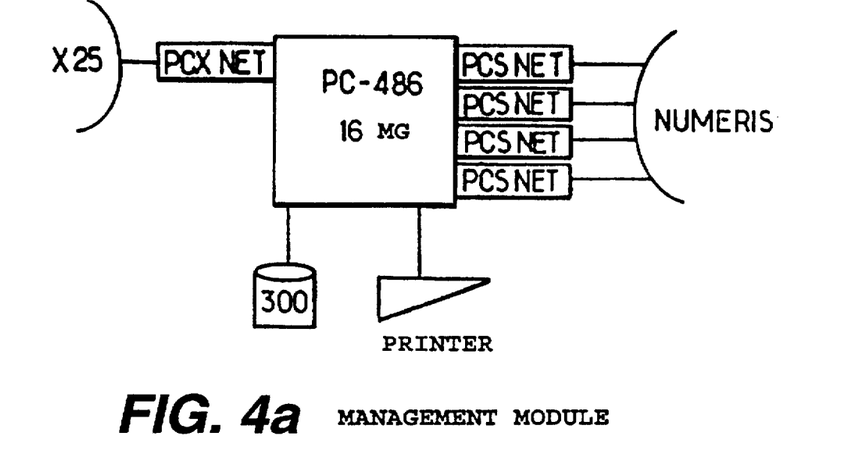

In FIG. 4a is represented a configuration of the management module, MG, which, apart from the previously mentioned microprocessor clocked at a frequency of 33 MHz, is equipped with a 16 MB random-access memory, a plurality of microcomputer telecommunication cards allowing attachment of a plurality of local subscriber terminals to the management module. It is pointed out that these telecommunication cards can consist of PCSNET-OST cards satisfying the NUMERIS standard and allowing simultaneous access by 8 terminals to the management module, MG.

Furthermore, the management module, MG, comprises a plurality of microcomputer/packet-switched digital link interface cards providing for the access and simultaneous connection of the management module, MG, to several separate remote server centres, SA. These cards are of the PCXNET-OST type allowing simultaneous access to several remote servers.

Generally, it is pointed out that the management module, MG, and the constituent microcomputer thereof are equipped with a UNIX-type operating system. This operating system, by virtue of its multiprocessor and multi-task architecture, makes it possible in particular to manage the multi-user and multi-network aspects of the management module, MG.

Application of the management module, MG, such as defined in connection with FIGS. 2a and 2b in particular, can be carried out by way of standardized server software, of REFTEL type. This software provides for the management of 8 subscribers, for example, connected by way of the NUMERIS network, and allows for the carrying-out of the aforesaid interactive dialogue. It also manages the multimedia and STUCAM protocols and allows easy upgrading to other types of networks.

Finally, a data-base management system of ORACLE type can be installed. It is of course pointed out that for installation of this set of functions, the aforesaid microcomputer can be furnished with a 300 MB hard disc.

Figure 4B:
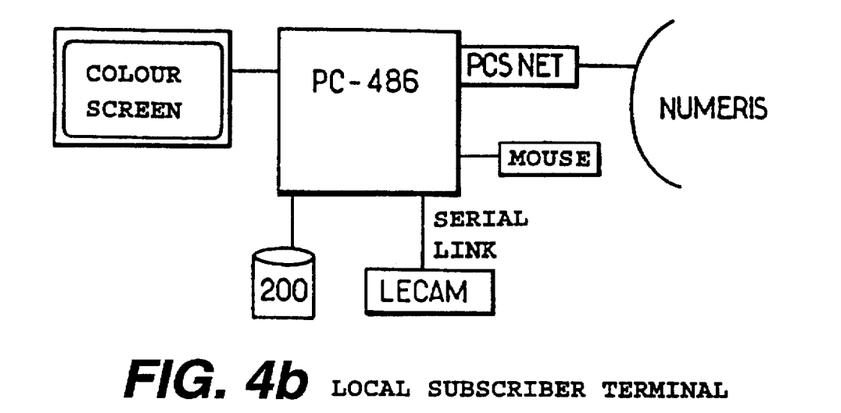

As represented in FIG. 4b, each local subscriber terminal, T, can be installed in a micro-computer containing the type of processor mentioned previously in the description, furnished with its peripherals. It also contains a NUMERIS, PCSNET-OST-type link card, a 200 MB capacity hard disc, a LECAM-type card reader with memory, and a mouse-type pointer.

The terminal is equipped with software of the applications software type including the REFTEL software, allowing multimedia consultation and file transfer, for example.

Figure 4C:
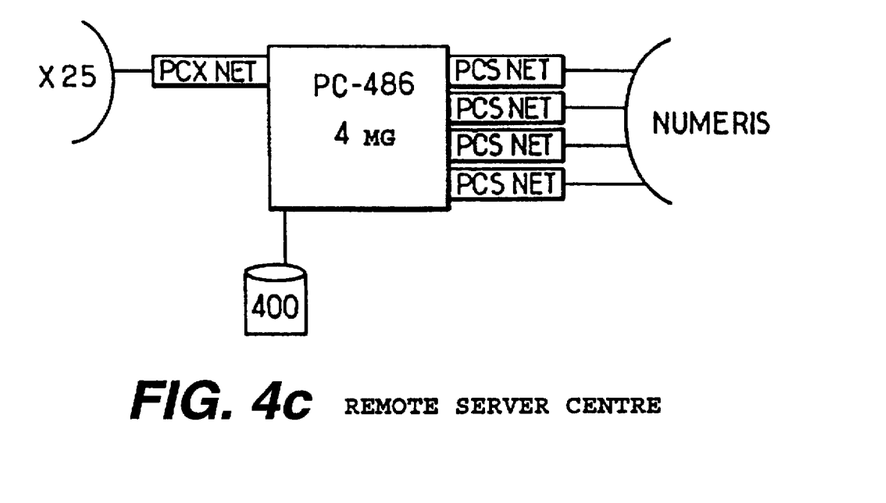

Finally, the remote server centre represented in FIG. 4 can also be installed in a PC microcomputer-type machine containing a processor mentioned previously in the description clocked at 33 MHz and a 4 MB random-access memory, for example. Each application server, SA, is also equipped with its peripherals and, furthermore, with microcomputer telecommunication cards for access by the terminals. These cards are of the PCSNET-OST type for example.

Access to the management module, MG, is likewise ensured by a PCXNET-OST-type packet-switched digital link microcomputer interface card.

All the references bearing the mark OST denote software products marketed in France by the company QUEST STANDARD TELEMATIQUE.

As regards intercommunications between the various elements of the management system which is the subject of the present invention, it is pointed out that the protocols employed to undertake the various communications are the protocols represented in the table below:

| PROTOCOL | DESIGNATION | EXCHANGE |
| --- | --- | --- |
| ETS 300 080 | Access to NUMERIS in X.25 | T-MT and T-SA |
| ETS 300 079 | Com. protocol in NUMERIS | T-MT and T-SA |
| ETS 300 075 | STUTEL file transfer | T-SA |
| ETS 300 072 | Alphamosaic | T-MT and T-SA |

-continued

| PROTOCOL | DESIGNATION | EXCHANGE |
| --- | --- | --- |
| ETS 300 073 | Geometric | T-SA |
| ETS 300 177 | JPEG photo syntax | T-SA |
| ETS 300 149 | Audio syntax | T-SA |
| ETS 300 076 | Terminal identification | T-MT and T-SA |
| JPEG | Picture compression | T-SA |
| G7 xx | Digital sound | T-SA |
| STUCAM | LECAM control | T-MT |

Among the protocols mentioned in the above table, it is pointed out that the label ETS designates the protocol defined in accordance with the specifications of the European Telecommunication Standard Institute, the designation JPEG designates protocols corresponding to the specifications defined by the International Standardization Organization.

The designation STUCAM corresponding to specifications published in France by FRANCE TELECOM.

There has thus been described a system for management of the usage of data consultations in a telecommunication network which is of especially high performance both from the point of view of the speed of action and ultimately of execution of the service provision and from the point of view of the flexibility of use.

As regards the speed of service provision, it is pointed out that, in the embodiment described in connection with FIG. 1b in particular, the access times are as follows:

- 3 seconds to 6 seconds to get through to the management module, MG, these times corresponding to the set-up time of the NUMERIS link,
- a few seconds for the processing by the management module, MG, these processing operations including in particular identification of the subscriber and application server to be consulted, verification of the credits assigned, and sending of the temporary key to the remote server, SA, and to the local subscriber, T,
- 3 seconds to 6 seconds to get through to the remote server, SA,
- 1 second for the application server, SA, to check the key.

The overall minimum set-up time for the subscriber is therefore less than 15 seconds.

Furthermore, from the point of view of the flexibility of use, it is pointed out that the management module, MG, enables the remote server centre, SA, to keep a rein on the amount of the tariff setting.

The subscriber can thus negotiate at the remote server centre, SA, the amount to be paid and vice versa, the remote server centre, SA, possibly having various strategies depending on the type of subscriber, contractually free from action, decreasing tariff commensurate with duration. The strategy matched to the user can thus be implemented on the basis of information corresponding to a user profile, which is communicated in the link 2.

Furthermore, the management module, MG, is a third party in whom the various subscribers have confidence. It is pointed out in particular that the management module, MG, can be stationed in any national territory which can be accessed by the telecommunication networks described previously in the description.

Finally, the management module, MG, manages two types of credit:

- the total credit allotted to the customer account, which can be managed with the technique of ceilings sliding over specified time intervals,
- the specific credit allotted per transaction and per individual, that is to say per local subscriber.

Finally, as regards the comparative areas of responsibility of the management module, MG, and of the remote server centre, SA, in regard to the local subscriber, it is pointed out that:

- the offering of the application servers or remote servers, SA, and the fixing of the amount to be registered are in the area of responsibility of the application servers,
- the defining of the amount of the credit accorded to a customer and the recovering of the negotiated amounts are in the area of responsibility of the management module, MG.

Finally, the architecture of the management system which is the subject of the present invention is open to other functional procedures, such as in particular the methods of payment and means of payment.

In the above description, access to a remote server SA was envisaged for a single management module MG. It goes without saying however, and this without departing from the scope of the subject of the present invention, that access to one and the same remote server can be managed, for a plurality of subscribers, by several separate management modules through identification of each relevant management module.

We claim:

1. A management system for managing data consultations in a network for telecommunication between a remote server center and a local subscriber terminal, communication between the remote server center and the local subscriber terminal being carried out by way of a telecommunication link of a switched type, said system including a management means, external to said link, for providing, through communication of an interactive type between said local subscriber terminal and said management means and between said management means and said remote server center, respectively, a communication protocol including successive steps comprising:

connection of said local subscriber terminal to said management means, acknowledgement of said connection and issuing of an access key providing access to said remote server center, transmission by said management means to said remote server center of a service request authorization message with respect to a corresponding subscriber terminal, and, on a first validation, by said remote server center, of said service request authorization message, request for connection and service provision of said local subscriber terminal to said remote server center, by transmission to said remote server center of a connection request message comprising said access key, and on a second validation of said connection request message, transmission of data between said remote server center and said local subscriber terminal in accordance with said requested service provision, and subsequent to said requested service provision being supplied and, transmission by said remote server center to said management means of a status message indicating the status of said requested service provision.

2. Management system according to claim 1, wherein communication between said management means and said local subscriber terminal is carried out by way of a telecommunication link whose data rate is less than or equal to the data rate of the link between the local subscriber terminal and the remote server.

3. Management system according to claim 1, wherein communication between said management means and said remote server center is carried out by way of a packet-switched digital link.

4. Management system according to claim 1, wherein said communication protocol further includes, subsequent to validation of said service provision status message by said management means, steps comprising:

transmission by said management means to said local subscriber terminal of an information message regarding billing of said service provision, and comprising a debit associated with said subscriber terminal, and transmission by said management means to said remote server center of a refund message for any remaining credit allotted in favor of said local subscriber terminal.

5. Management system according to claim 1, wherein said connection request message includes information allowing the local subscriber terminal to negotiate an actual amount of said communication.

6. Management system according to claim 1, wherein said step of connection of said local subscriber terminal to said management means, said step of transmission by said management means to said remote server center of a service request authorization message, said step of transmission by said local subscriber terminal to said remote server center of a connection request message, said step of transmission and exchange of data between said remote server centre and said local subscriber terminal, and said step of transmission by said remote server center to said management means of a service provision status message are carried out in real time.

7. Management system according to claim 1, wherein said management means comprises:

at least one microcomputer furnished with peripheral elements, said microcomputer comprising a plurality of telecommunication cards for said microcomputer allowing attaching of a plurality of local subscriber terminals, and a plurality of packet-switching digital link microcomputer interface cards enabling access and simultaneous connection to a plurality of separate remote server centers.

8. Management system according to claim 4, wherein said step of transmission by said management means to said local subscriber terminal of said information message regarding billing and said step of transmission by said management means to said remote server center of said refund message are performed in real or non-real time.

9. Management system according to claim 7, wherein said management means is interconnected with a remote authorization center.

10. Management system according to claim 7, wherein said management means is interconnected with an electronic payment system.

* * * * *